Jan. 3, 1928.
H. G. TRAVER
1,654,670
COASTER TRAIN
Filed Aug. 10, 1926  2 Sheets-Sheet 1
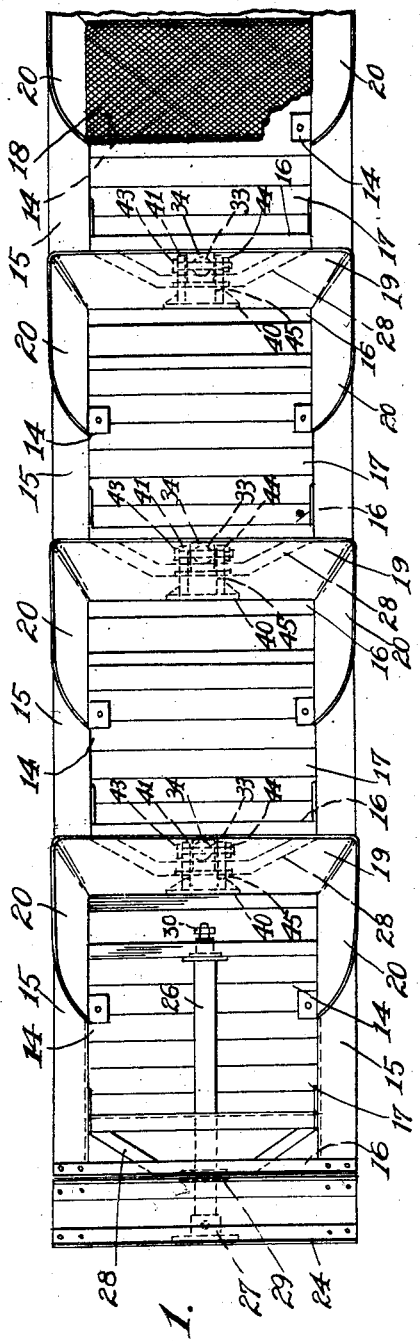
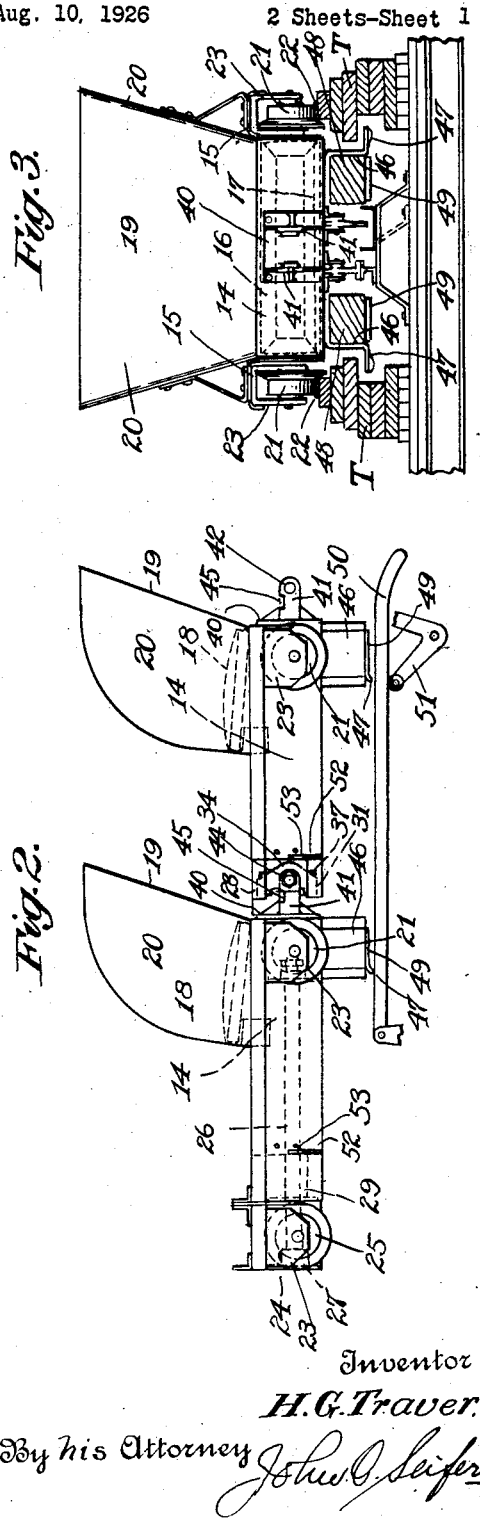
Inventor
H. G. Traver
By his Attorney John J. Seifert Jan. 3, 1928.　　　　　　　　　　　1,654,670
H. G. TRAVER
COASTER TRAIN
Filed Aug. 10, 1926　　　2 Sheets-Sheet 2
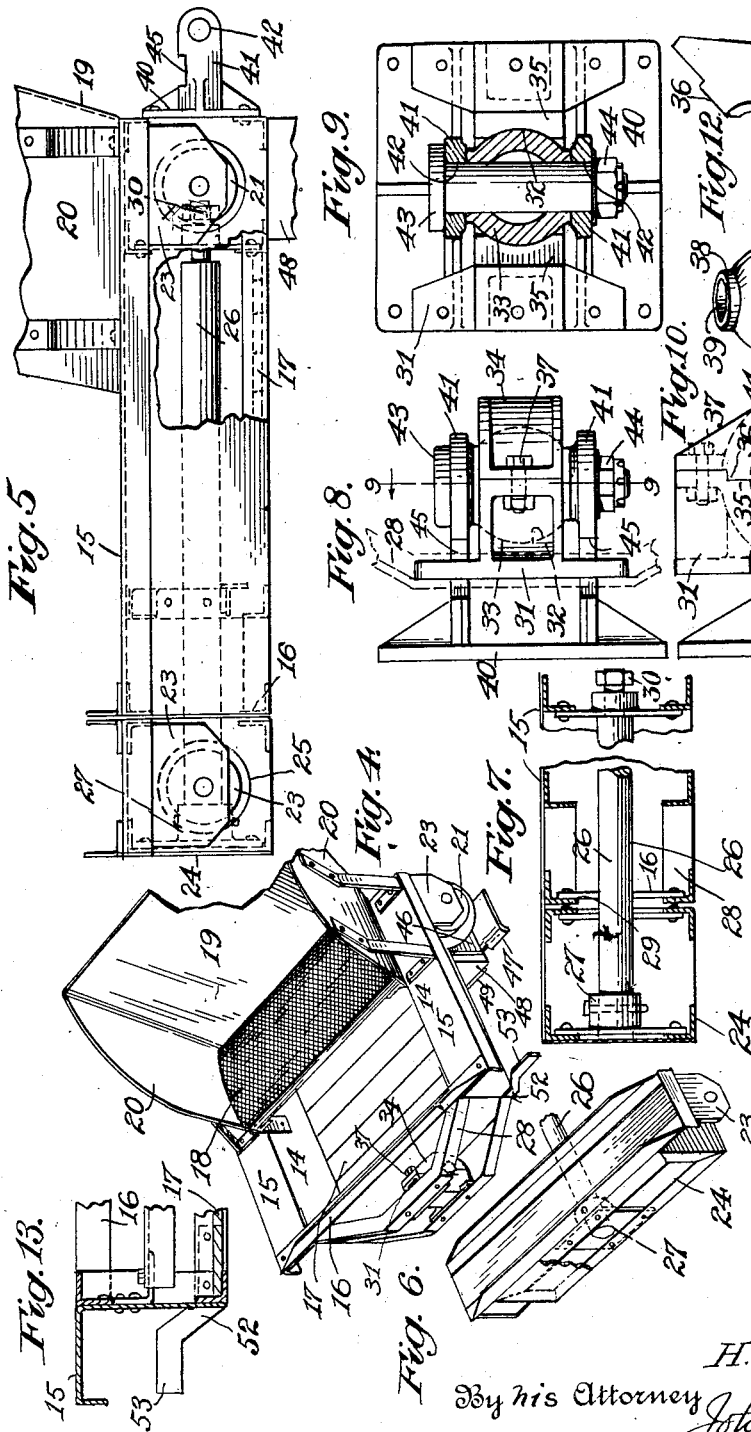
Inventor
H. G. Traver
By his Attorney Patented Jan. 3, 1928.

1,654,670

UNITED STATES PATENT OFFICE.

HARRY G. TRAVER, OF BEAVER FALLS, PENNSYLVANIA.

COASTER TRAIN.

Application filed August 10, 1926. Serial No. 128,341.

This invention relates to amusement rides wherein a train the cars of which are interconnected and each of the cars of the train, with the exception of a car at one end, is supported at one end by traction wheels and the opposite end being coupled and supported by the wheel supported end of an adjacent car, a traction wheel supported truck being coupled to and supporting the one end of an end car, and it is the object of the invention to provide improved means for coupling the cars of a train together and support the one end of a car from an adjacent car to provide a train of flexibly connected cars to permit the cars of a train to assume variable positions one relative to the other due to irregularities in a track structure along which the train is propelled without setting up stresses and strains in the structure of the cars.

A further object of the invention relates to the arranging of the coupling means for cars in a train of this character as a main coupling means to normally couple the cars together to permit one car to have variable movement relative to another car, and an auxiliary coupling means rendered effective and operative to automatically couple the cars together upon the main coupling means being rendered ineffective as by the breaking of the same during the travel of the train.

Another object of the invention relates to certain features of structure of a car in coaster trains to provide safety means which not only serves to prevent a car from leaving the track but serves as an emergency support for the cars.

Other objects and advantages will hereinafter appear.

In the drawings accompanying and forming a part of this specification I have shown an embodiment of the invention in which Figure 1 is a plan view of a train of cars showing my improved means for coupling the cars of the train together.

Figure 2 is a side elevation of the first two cars of a train to show the manner of supporting the one end of the cars upon the traction wheels and the coupling to and supporting of one car from the wheeled end of an adjacent car, as well as the supporting of the forward end of the forward car.

Figure 3 is an end elevation of a car showing the same engaged upon a track structure and the latter shown in section.

Figure 4 is a perspective view, partly broken away, of a car to show the structure of the car body and frame.

Figure 5 is a side elevation of the forward or pilot car and the manner of supporting the same upon a pilot truck.

Figure 6 is a perspective view of the frame of the pilot truck.

Figure 7 is a sectional view of the pilot truck and the means to couple the same with the pilot car.

Figure 8 is a view looking at the top of the coupling means for the cars of the train.

Figure 9 is a sectional view of the coupling means taken on the line 9—9 of Figure 8.

Figure 10 is a side elevation of the coupling means.

Figure 11 is a perspective view of a spherical or ball member forming a part of the coupling means.

Figure 12 is a perspective view of a socket member forming a part of the coupling means to embrace the spherical or ball member; and Figure 13 is an end elevation of a portion of a car frame to show the arrangement of an emergency support mounted thereon.

In carrying out the invention there is provided a train embodying a series of interconnected cars 14, in the present instance as shown in Figure 1, four in number, although in practice a greater number of cars may be used. Each car embodies a suitable frame work, comprising side members 15 substantially of inverted L shape in cross section one portion extending in a vertical plane and the other portion laterally of the sides, said members being connected at opposite ends by cross members 16 and arranged with a flooring 17. The forward end of the frame is extended forwardly as at 28, having the end portions converging from the sides and merging with an intermediate portion extending parallel with the front cross member 16 for a purpose to be hereinafter described. A seat 18 is mounted upon the side members at the rear thereof, said seat having a back rest 19 and side supports 20.

The rear ends of the cars are supported by wheels 21 to have traction upon a track structure (designated in a general way by T) built up of laminations of boards and having a sheet metal strip 22 at the top. The wheels are journalled upon studs or axles mounted in carriers 23 of inverted U shape in cross section fixed to and within the side members of the frame, as clearly shown in Figure 3.

The forward end of the one end or pilot car is supported by a pilot truck comprising a rectangular frame 24 the top member of which is extended beyond the ends and mounted at opposite ends upon flanged wheels 25, the wheels being journalled upon studs or shafts fixed in inverted U shaped members similar to the mounting of the wheels at the rear of the cars, and fixed to the ends of the truck frame. The truck is coupled with the adjacent car by a shaft 26 fixedly mounted at one end intermediate the ends of the truck, as at 27, to extend in the plane of the longitudinal axis of the car. The side members of the forward car are extended forwardly of the cross member 16 with the ends terminating in a plane with the intermediate portion of the extended frame portion 28 with a cross plate 29 fixed at opposite ends to the extensions of the side members, as shown in Figures 1 and 2. The shaft 26 extends from the front cross plate 29 and has the inner end reduced and rotatably mounted in a bearing fixed to angle iron bars extending transversely of the frame and fixed at opposite ends to the frame sides 15 and held against longitudinal movement by a nut 30 fixed on said reduced end of the shaft, as shown in Figure 7.

To support the forward end of an adjacent or following car and couple the two cars together a bracket or bearing member 31 is fixed to the intermediate portion of the frame extension 28 in line with the longitudinal axis of the car frame and having a semi-spherical or globular recess 32 with a ball or spherical member 33 engaged or seated in said recess and retained thereby by a cap 34, said cap having a semi-spherical or globular recess to fit the contour of the spherical member 33 secured to the member 31 as by bolts or cap screws 37, said latter member having an undercut portion in the face thereof for the engagement of a portion 36 projecting from the face of the cap to hold the two members against lateral displacement. The members 31 and 34 form a socket member of a ball and socket coupling the other member of which comprises the spherical member 33 whereby one member of the coupling may have universal movement relative to the other coupling member. The spherical coupling member 33 has diametrically opposite extending trunnions 38 with an opening 39 extending diametrically through the spherical coupling member and trunnions. One member of the ball and socket coupling, in the present instance the socket member 31, 34, is fixed to the intermediate portion of the frame extension 28 of a car to engage between said frame extension and the cross member 16 of the car frame, as clearly shown in Figure 4. The other or spherical member 33 is connected to the adjacent forward car. For this purpose a bracket 40 is fixed to the rear of the car, as to the rear cross member of the frame, said bracket having a bifurcation 41 extending rearwardly with the legs of the bifurcation arranged in parallel relation to and at opposite sides of the longitudinal axis of the car and having perforations or openings 42 therein. The spherical member 33 is engaged between the legs of the bifurcation with the ends of the trunnions contiguous to said legs and the opening through the spherical member in line with the perforations 42 and secured in said position by a headed stud or pin 43 engaged in the bifurcation perforations 42 and the opening through the spherical member and secured therein by a nut 44 threaded onto the outer end of said pin. The coupling members 31, 34 and 40 are adapted not only to have movement on a horizontal axis extending transversely of the cars, but also to have universal movement about the spherical member 33 of the coupling, thus facilitating the travel of the cars in safety around curves and down and up rises and dips in the track structure without the possibility of one car exerting a force upon another car or cars which may tend to derail the same. By this arrangement the forward end of a car is not only coupled to the next forward car but the traction wheel supported rear of a forward car also serves as a support for the forward end of the succeeding car.

Should the cars be uncoupled as by the breaking of a member of the ball and socket members of the coupling, as by the shearing of the connecting pin, or the releasing of the coupling cap 34, and a consequent dropping of the forward end of a car with the possibility of injury to the passengers the coupling members 31, 40 are arranged as auxiliary coupling members adapted to be automatically operative to couple the cars together should the ball and socket portions of the main coupling be rendered inoperative for any reason. For this purpose a recess 45 is cut into the top edge of each of the legs of the bifurcation of the bracket 40 and an intermediate portion of the frame extension 28 is adapted to engage in said recesses and should the forward end of a car drop said intermediate portion will engage and be supported upon the bifurcated arms in position to be engaged by the rear walls of said recesses and thereby coupling the cars together.

Means are provided to prevent derailment of the cars, or the lifting of the cars from the track when braking mechanism is set in operation to bring the cars to a stop as they enter the leading station of the ride, said means being herein termed as "safety shoes" and comprising sheet metal members 46 fixed to the bottom of the car frame having a portion bent at a right angle to extend vertically downward between the track with the extremity 47 bent substantially at a right angle to extend laterally and below an inwardly extending portion of a lamination of the track structure with the leading edge of said extended portion 47 slightly curved or bent downwardly to facilitate the engagement of the laterally extending portion with the track lamination to have sliding engagement therewith. These safety shoes 46 are mounted on the cars in interposed relation to blocks 48, preferably of wood, carrying plates 49 on the undersurface to serve as brake shoes for the slidable engagement of a rail 50 pivotally mounted on supports 51 pivotally carried on the track supporting structure, and one of said supports 51 being arranged with a hand lever operative to move the rail upward and into engagement with the brake shoes 49, this being arranged at the loading station to retard the movement of and bring the cars to a stop at the loading station.

The cars are also provided with an emergency support at the forward end, comprising plates 52 fixed to the ends of the cross member 16 at the forward end and having a member 53 extending upwardly and laterally of the car frame to position above the track rails, as shown in Figure 13.

Having thus described my invention I claim:

1. In a coaster train, a plurality of cars, each car arranged with wheels at one end for traction support, the opposite end being arranged with means to couple the car to and support the same from the wheel supported end of an adjacent car, comprising a spherical member carried by one car to have free universal movement, and means movably connected with the spherical member mounted on the other car.

2. In a coaster train, a plurality of cars, each car arranged with wheels at one end for traction support, the opposite end being arranged with means to couple the car to and support the same from the wheel supported end of an adjacent car, comprising a spherical member mounted on one car to have free universal movement, and means fixed on the other car pivotally connected with the spherical member.

3. In a coaster train, a plurality of cars, each car arranged with wheels at one end for traction support, the opposite end being arranged with means to couple the car to and support the same from an adjacent car, comprising a carrier mounted on the end of the frame of one car, a ball member movably mounted within said carrier having axial oppositely extending trunnions with an opening through said member and trunnions, and a bifurcated member carried by the other car having perforations in the legs of the bifurcations and between which bifurcation the trunnions of the spherical member are adapted to engage, and means engaged in the perforations of the bifurcation legs and spherical member for coupling the cars together.

4. A coaster train embodying a plurality of cars as claimed in claim 3, wherein the bifurcated member on the one car is arranged with a recess in the top and the carrier for the spherical member mounted on the other car being arranged to extend over said bifurcated member superposed to said recess for the purpose specified.

5. In a coaster train embodying a plurality of cars, each car arranged with and supported by traction wheels at one end, the opposite end being arranged with means to couple the car to and support the same from the wheel supported end of an adjacent car comprising a spherical member, a socket member in which the spherical member is mounted to have free universal movement mounted on said unsupported car end, and a perforated bifurcated member carried by the wheel supported end of the other car for engagement at opposite sides of and pivotally connected with the spherical member.

6. In a coaster train embodying a plurality of cars, each car arranged with wheels at one end for traction support, the unsupported end of one car being arranged with means to couple the car to and support the same from the wheel supported end of an adjacent car, comprising a socket member carried at the end of one car, a spherical member mounted in the socket member and the latter adapted to have universal movement, said socket member having trunnions extending laterally therefrom, and a bifurcated member having the legs perforated mounted on the end of the other car for engagement of the trunnions of the spherical member therebetween, and means to engage in the bifurcation perforations and having an operative connection with the spherical member to permit of movement of the spherical and bifurcated members about a horizontal axis and extending transversely of the cars and said members to have universal movement relative to the socket member.

7. In a coaster train embodying a plurality of cars, each car arranged with and supported by traction wheels at one end, the opposite end of each car being arranged with means to couple the car to and support the same from the wheel supported end of an adjacent car, comprising a spherical member mounted on one car to permit said member and the car to have movement one relative to the other about a horizontal axis extending transversely of the car, and a socket member mounted on the adjacent car and embracing the spherical member to permit said spherical and socket members to have universal movement one relative to the other to compensate for the movement between the cars of the train.

8. In a coaster train embodying a plurality of cars, each car arranged with and supported by traction wheels at the rear end, the front end of each car being arranged with means to couple the car to and support the same from the wheel supported end of the car forward thereof, comprising a spherical member carried by one car to have movement on a horizontal axis extending transversely of the car, and a socket member embracing the spherical member mounted on the other car to permit of universal movement of the spherical and socket member relative to each other.

9. In a coaster train, a plurality of cars, each car being arranged with wheels for traction support at one end, and means to couple the other end of the car with the wheel supported end of an adjacent car, comprising main coupling means to permit of the cars to have universal movement relative to each other, and an auxiliary coupling means adapted to be automatically operative to couple the cars upon the disconnecting of the main coupling means.

10. In a coaster train, a plurality of cars, each car arranged with and supported by traction wheels at one end, and a coupling member carried by each car to couple and support the other end of the cars from the traction wheel supported end of an adjacent car, one coupling member embodying a sphere and a socket to embrace and carry the sphere mounted on one car, and the other coupling member mounted on the other car and pivotally connected to the sphere, and said coupling members arranged with parts normally out of connection and adapted to be automatically connected to couple the cars together by the sphere and socket being rendered inoperative to couple the cars.

11. In a coaster train, a plurality of cars, each car embodying a supporting frame arranged with wheels to tractionally support the car at one end, a socket member carrying a ball therein fixed to the opposite end of the car frame in a plane with the longitudinal axis of the car, means to connect the ball to the wheel supported end of an adjacent car, and plates fixed to the bottom of the car frame to extend downwardly and then in a direction laterally of the frame to be disposed below and normally out of contact with the rails of the track structure upon which said wheels travel.

12. In a coaster train, a plurality of cars, each car embodying a supporting frame with wheels at the rear end to tractionally support the car, a socket member carrying a ball therein fixed to the forward end of the car frame in a plane with the longitudinal axis of the car, a bifurcated bracket extending rearwardly from the frame of the wheel supported end of an adjacent car to which the ball is pivotally connected, and plates fixed to the forward end of the car frame to extend upwardly and laterally thereof and normally disposed above and out of contact with the rails of the bracket structure upon which the traction wheels travel.

13. In cars for coaster trains as claimed in claim 2, whereby the traction wheels are arranged for travel upon rails of a track structure, plates fixed to the cars to extend downwardly therefrom within the rails and then laterally below an inwardly extending portion of said rails, and plates fixed to and extending laterally of the cars above the rails of the track structure, and said plates being normally positioned out of contact with the track rail.

Signed at the city of New York, in the county of New York and State of New York this 13th day of July, 1926.

HARRY G. TRAVER.